(12) United States Patent
Hauke et al.

(10) Patent No.: US 11,177,737 B2
(45) Date of Patent: Nov. 16, 2021

(54) SWITCHING CONTROL FOR POWER CONVERTERS

(71) Applicant: Texas Instruments Incorporated, Dallas, TX (US)

(72) Inventors: Brigitte Hauke, Freising (DE); Milos Acanski, Freising (DE); Christian Schmoeller, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/897,839

(22) Filed: Jun. 10, 2020

(65) Prior Publication Data

US 2021/0021192 A1 Jan. 21, 2021

Related U.S. Application Data

(60) Provisional application No. 62/876,256, filed on Jul. 19, 2019.

(51) Int. Cl.
*H02M 3/157* (2006.01)
*H02M 3/338* (2006.01)
*H02M 1/00* (2006.01)
*H02M 3/156* (2006.01)

(52) U.S. Cl.
CPC ......... *H02M 3/157* (2013.01); *H02M 3/3385* (2013.01); *H02M 1/0012* (2021.05); *H02M 1/0032* (2021.05); *H02M 1/0041* (2021.05); *H02M 3/1566* (2021.05)

(58) Field of Classification Search
CPC .. H02M 3/157; H02M 3/3385; H02M 1/0032; H02M 1/0012; H02M 3/1566; H02M 1/0041
See application file for complete search history.

(56) References Cited

U.S. PATENT DOCUMENTS

| 2016/0190923 | A1* | 6/2016 | Veeramreddi | H02M 3/158 323/271 |
| 2017/0077817 | A1* | 3/2017 | Houston | H02M 3/1582 |
| 2020/0119641 | A1* | 4/2020 | Liang | H02M 1/15 |

OTHER PUBLICATIONS

Publication, "NCP1027 High-Voltage Switcher for Medium Power Offline SMPS Featuring Low Standby Power"; Published in ON Semiconductor, Semiconductor Components Industries, LLC; Jan. 2015; 30 pgs.
Min-Sung Kim, et al., "Advanced Burst Mode Control to Reduce the Standby Power of Flyback Converter"; Engineering, 2013, 5, 137-141doi:10.4236/eng.2013.51b025, Published Online Jan. 2013 (http://www.SciRP.org/journal/eng); 5 pgs.

* cited by examiner

*Primary Examiner* — Adolf D Berhane
(74) *Attorney, Agent, or Firm* — Michael A. Davis, Jr.; Charles A. Brill; Frank D. Cimino (57) ABSTRACT

In a described example, a circuit includes a mode control circuit having an input and a mode control output. The mode control output is adapted to be coupled to a mode input of a DC-to-DC power converter. The mode control circuit is configured to provide a mode control signal at the mode control output. The mode control signal has a frequency and a duty cycle for causing the power converter to operate within an inaudible frequency range by transitioning the power converter between a power save mode and a pulse width modulation (PWM) mode. The mode control circuit is configured to control the duty cycle responsive to the input of the mode control circuit.

22 Claims, 5 Drawing Sheets

SWITCHING CONTROL FOR POWER CONVERTERS

RELATED APPLICATIONS

This application claims priority from U.S. Provisional Patent Application Ser. No. 62/876,256, filed Jul. 19, 2019, and entitled APPARATUS FOR ELIMINATING AUDIBLE NOISE OF SWITCHING AND BURST FREQUENCY IN DC/DC CONVERTERS WITH SEAMLESS PFM/PWM MODE TRANSITION, which is incorporated herein by reference in its entirety.

TECHNICAL FIELD

This relates to implementing switching control for a power converter.

BACKGROUND

Examples of power supply circuits include synchronous rectifier power converters, resonant power converters, and any of a variety of other types of switching power converters. Power converter and power supply devices may be configured to operate in a power saving mode, such as when there is little or no load applied to an output. In these situations, switch devices may operate in bursts of switching activity separated by periods when the device does not switch. Power converters further may switch between the power saving mode and a forced pulse width modulation (PWM) mode. If the repetition rate for such bursts exceeds a certain duration (e.g., an audio duration), the switching bursts may be rendered audible, which is undesirable in many applications.

SUMMARY

In a described example, a circuit includes a mode control circuit having an input and a mode control output. The mode control output is adapted to be coupled to a mode input of a DC-to-DC power converter. The mode control circuit is configured to provide a mode control signal at the mode control output. The mode control signal has a frequency and a duty cycle for causing the power converter to operate within an inaudible frequency range by transitioning the power converter between a power save mode and a pulse width modulation (PWM) mode. The mode control circuit is configured to control the duty cycle responsive to the input of the mode control circuit.

In another described example, a power supply system includes a DC-to-DC power converter having a mode input and a voltage output. The power converter is configured to provide a regulated DC output voltage at the voltage output. A mode control circuit has an input and a mode control output. The mode control output is coupled to the mode input of the power converter to provide a mode control signal. The mode control signal has a frequency and a duty cycle. The mode control circuit controls the duty cycle responsive to the input of the mode control circuit. The power converter is configured to operate within an inaudible frequency range by switching between a pulse width modulation (PWM) mode and a power save mode responsive to the mode control signal.

In yet another described example, a method includes generating a mode control signal that is provided to a mode control input of a DC-to-DC power converter, the mode control signal having a frequency and a duty cycle that is configurable. The method further controls the power converter to operate in a power save mode based on the mode control signal being in a first state. The method further controls the power converter to operate in a pulse width modulation (PWM) mode based on the mode control signal being in a second state, which is different from the first state. The power converter operates within an inaudible frequency range including during transitions between the power save mode and the PWM mode.

DETAILED DESCRIPTION

Example embodiments relate to a mode control circuit to control a DC/DC power converter to operate without producing audible switching noise. For example, the mode control circuit has an output configured to provide a mode control signal to a mode input of the DC-to-DC power converter. The mode control circuit provides the mode control signal to control the DC/DC converter to operate in a pulse width modulation (PWM) mode (e.g., a forced PWM mode) or a power save mode, which depends on the state of the mode control signal. The mode control signal is a pulse having a fixed frequency and a duty cycle. The duty cycle is configurable based on one or more input to the mode control circuit. In some examples, the duty cycle is set (e.g., initialized) according to a value that is stored in memory, which can be implemented as one-time programmable (OTP) device (e.g., an electrically programmable read only memory (EPROM)), or other types of storage devices (e.g., electrically erasable and programmable read only memory (EEPROM), flash memory or a register). In other examples, the input may be provided as a digital control word through a hardware interface (e.g., an Inter-Integrated Circuit ($I^2C$), Power Management Bus (PMBus) or other control interface). In still other examples, the mode control circuit has one or more inputs coupled to respective outputs of the power converter to control the duty cycle of the mode control signal. For example, the mode control circuit evaluates whether the DC/DC converter is operating within a target range based on the outputs of the power converter and adjusts the duty cycle of the mode control signal based on the evaluation.

In the embodiments described herein, the duty cycle of the mode control signal may be set to favor the power save mode but of sufficient duration to force the power converter into the PWM mode before rendering switching to be audible. As described herein, the duty cycle may be initialized based on an input to the mode control circuit and/or be adjusted in real-time. In this way, the DC/DC converter can achieve good power efficiency and reduce frequency components of the switching frequency in the audible range. In addition to reducing the audible noise, the mode control circuit can set a minimum frequency for the overall operation, which could also be beneficial for some other use cases. For example, in some applications the minimum frequency may help to reduce output voltage ripple.

The mode control circuit may be implemented independent of the architecture of the power converter. That is, the mode control circuit may be utilized with any DC/DC power converter, including buck, boost and buck-boost that supports mode transition between PWM and power save modes. In some examples, the mode control circuit can be implemented within an integrated circuit (IC) that includes the power converter (e.g., by tapping the mode control signal into the mode select input of the converter). In other examples, the mode control circuit can be implemented as a standalone circuit (e.g., on an IC or printed circuit board), which is external to the power converter IC.

In this description, the term "circuit" can include a collection of active and/or passive elements that perform an electronic circuit function, such as an analog circuit and/or digital circuit. Additionally or alternatively, for example, the term "circuit" can include an IC in which all or some of the circuit elements are fabricated on a common substrate (e.g., semiconductor substrate, such as a die or chip) or within a common package herein. For example, circuitry of a power converter (e.g., the control loops, switch circuits, drivers and the like) may be implemented in an IC chip.

Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 1:
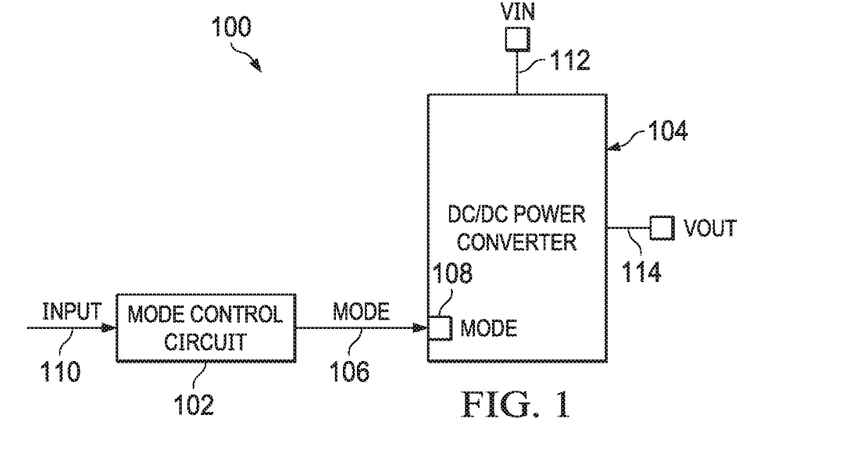
FIG. 1 is a block diagram illustrating an example of a power supply configured to implement out-of-audio switching.

FIG. 1 is a block diagram of a system 100 that includes a mode control circuit 102 and a DC/DC power converter 104. The mode control circuit 102 is configured to provide a mode signal (MODE) 106 to a mode selection input 108 of the DC/DC power converter 104. For example, the mode control circuit 102 provides the mode control signal as a periodic pulse having a fixed frequency and a configurable duty cycle. The mode control circuit controls the duty cycle of the mode control signal based on one or more inputs 110 supplied to the mode control circuit. In an example, the control of the duty cycle includes an initialization of the duty cycle responsive to the mode control input, such as by storing a value in memory of the mode control circuit or setting a one-time programmable device to a corresponding value. In another example, the control of the duty cycle includes adjusting (e.g., in real-time) the duty cycle during operation of the mode control circuit.

As described herein, the DC/DC power converter 104 may be implemented as any DC/DC power converter, including a buck converter, a boost converter or a buck-boost converter, which supports mode transition between PWM and power save (PS) modes based on the mode signal received at the converter's mode selection input 108. The DC/DC power converter 104 includes a voltage input 112 coupled to an input voltage terminal a DC input voltage (VIN) and a voltage output 114 coupled to provide a DC output voltage (VOUT). The DC/DC power converter 104 also includes a switch circuit (e.g., an arrangement of one or more power transistors), which may be coupled between the voltage input 112 and voltage output 114, to provide the output voltage VOUT based on switching control. For example, the power converter 104 implements a control loop to regulate the output voltage VOUT and implement the switching control according to a target voltage and based on the input voltage VIN. During operation, the MODE signal 106 is configured to seamlessly transition the DC/DC power converter 104 between the PWM and PS modes and control timing between such mode transitions to avoid audible switching noise.

As described herein, the power save mode corresponds to a sustained period of deactivation of transistors in the switch circuit (e.g., a non-switching state of the switch circuit). When the switch circuit of the power converter 104 is deactivated during the power save mode, such as during light or no load conditions, the amplitude of the output voltage VOUT is set by the charge stored on an output capacitor that may be coupled to the voltage output 114. As described herein, the PWM mode corresponds to sequential on-time and off-time of the transistors of the switch circuit (e.g., a switching state of the switch circuit), which occurs during normal load operation of the power converter 100. If left alone during the power save mode, the charge held by output capacitor may discharge due to light loads or through leakage.

The MODE signal 106 has a state (e.g., logic HIGH or logic LOW) to operate the DC/DC power converter 104 in either a forced pulse width modulation (PWM) mode or a power save (PS) mode based on the mode control signal. The particular state (e.g., logic level) of the MODE signal 106, which is used for setting the operating mode of the power converter 104 in the PWM or PS mode, may vary according to the logic implemented by the power converter. As described herein, the duty cycle of the mode control signal may remain fixed after being set or it may vary over time. In some examples described herein, the mode control circuit 102 provides the mode control signal with fixed frequency and a fixed duty cycle, which is set based on the input 110. In other examples described herein, the mode control circuit 102 provides the mode control signal with a fixed frequency and variable duty cycle, which varies based on the one or more inputs 110.

Figure 2:
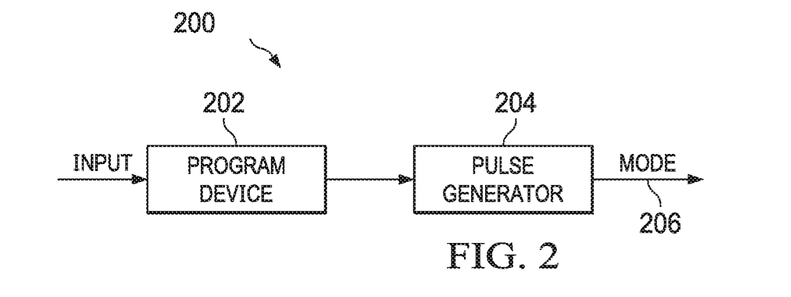
FIG. 2 depicts an example of a mode control circuit that may be implemented in FIG. 1.

FIG. 2 depicts an example of a mode control circuit 200, which is an example of the mode control circuit 102 of FIG. 1. The mode control circuit 200 includes a programmable device 202 having an input to receive a program input signal (e.g., the input 110 of FIG. 1), which may be a trim command to configure the programmable device to initialize the duty cycle. For example, the programmable device 202 may be implemented an OTP EPROM or an EEPROM that is programmed based on trimming. For example, the trimming may be determined by bench validation, simulation, or even during production testing, to program the device 202 with a value to set the duty cycle. The programmable device 202 includes an output coupled to a pulse generator 204 to supply a duty cycle value. The pulse generator 204 is configured to provide the MODE signal 206 with a fixed frequency and a fixed duty cycle, which are controlled based on the program input. For example, the pulse generator may provide the MODE signal with a frequency of 20 kHz or greater and a duty cycle of less than 10% (e.g., about 0.5%, about 0.2% or less) to achieve a desired efficiency across a range of load conditions. In an example, the pulse generator 204 may be implemented using a 555 timer circuit, such as by configuring the LM555 IC chip, which is available from Texas Instruments Incorporated, to operate in an astable mode. The fixed duty cycle and frequency provide the mode signal with relaxed timing characteristics, which operate the DC/DC converter within the inaudible frequency range in either the PWM or PS mode for a duration sufficient to allow the output voltage VOUT to settle following a mode transition. Because the duty cycle is programmable, as described with respect to the example of FIG. 2, the timing characteristics (e.g., frequency and duty cycle) can be optimized to achieve a desirable power efficiency, while ensuring that the device operates often and long enough in PWM mode to provide a stable output voltage regulation without charge buildup.

Figure 3:
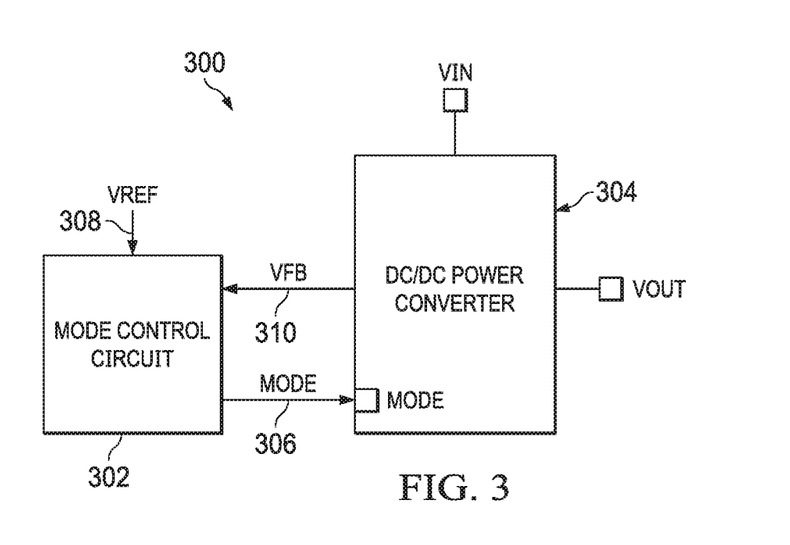
FIG. 3 is a block diagram illustrating an example of another power supply configured to implement out-of-audio switching.

FIG. 3 depicts another example of a system 300 that includes a DC/DC power converter 304 and a mode control circuit 302, which provides the mode control signal 306 with a fixed frequency and a variable duty cycle. For example, the mode control circuit 302 includes inputs 308 and 310 to receive a reference voltage input (having a voltage VREF) and a feedback output (having a feedback voltage (VFB)) (which are examples of the one or more inputs 110 in FIG. 1). In the example of FIG. 3, the DC/DC power converter 304 supplies VFB, which is derived based on the output voltage VOUT provided by the converter at 310. The reference voltage, which is representative of a target DC voltage for the power converter 304, may be supplied by the power converter 304 or by an external circuit (not shown). The mode control circuit 302 is configured to supply the mode control signal 306 to set an operating mode of the power converter 304, which varies based on VREF and VFB signals. By providing the MODE signal 306 with a duty cycle that varies based on operation of the DC/DC power converter 304, the overall efficiency of the DC/DC power converter may be increased compared to operating in the PWM mode while also avoiding operation in the audible frequency range.

Figure 4:
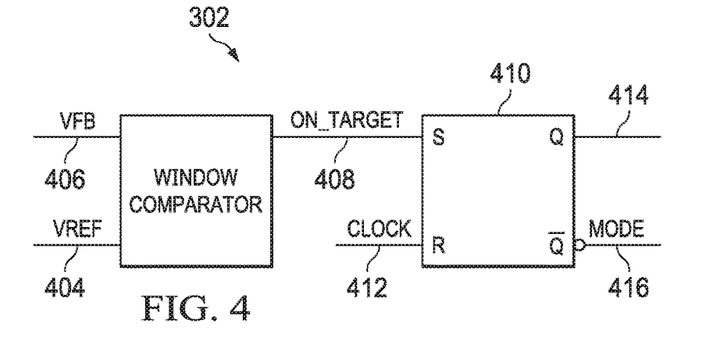
FIG. 4 depicts an example of a mode control circuit that is implemented in FIG. 3.

FIG. 4 depicts an example of the mode control circuit 302 of FIG. 3. The mode control circuit 302 includes a window comparator 402 that includes inputs 404 and 406 coupled to the converter for receiving input signals VREF and VFB (which correspond to inputs 308 and 310 of FIG. 3). The window comparator 402 provides an ON_TARGET signal at an output 408, which is coupled to an input of a latch device 410. The window comparator provides the ON_TARGET signal with a logic value based on input signals VREF and VFB, which logic value indicates whether the output voltage VOUT resides an amplitude window of the desired target voltage. As one example, the target voltage may be 500 mV and the amplitude window may be ±50 mV. In this example, the ON_TARGET signal is logic HIGH if VOUT resides ±50 mV of the 500 mV target and ON_TARGET signal is logic LOW if VOUT resides outside of ±50 mV of the 500 mV target. Other target voltages and amplitude windows may be used according to application requirements. As another example, the amplitude window may be set to establish an upper threshold relative to the target voltage for the power converter and a lower threshold and comparison may alternatively be implemented by a main control loop of the power converter for regulating VOUT. The amplitude window implemented by the window comparator 402 may be fixed (e.g., a fixed voltage range or a percentage with respect to the reference voltage VREF) or it may be programmable (e.g., by setting a value of a register entry).

In the example of FIG. 4, the latch device 410 is implemented as an SR latch (also referred to as an SR flip-flop) that includes set (S) and reset (R) inputs. For example, the SR latch is a reset-dominant SR latch. The S input is coupled to the output 408 to receive the ON_TARGET signal and another input 412 (the R input) is adapted to be coupled to an output of an oscillator or other clock generator to receive a CLOCK signal (also referred to herein as a mode clock signal). For example, the CLOCK signal has a fixed frequency (e.g., 20 kHz or greater). The duty cycle of the clock cycle also may be fixed (e.g., 5%) to provide a pulse at the output that is long enough to ensure that power converter switches at least once each cycle of the CLOCK signal. Accordingly, a minimum duty cycle may vary according to the configuration of the power converter. The latch device 410 also includes outputs 414 and 416, which are shown as Q and !Q, respectively. In an example, the latch device 410 supplies the MODE signal at the !Q output 416, which varies based on the ON_TARGET and CLOCK signals supplied to the respective S and R inputs. In this way, the MODE signal is logic HIGH, which forces the power converter into the PWM mode, when the CLOCK signal resets the latch device. The latch device 410 provides the MODE signal at a logic LOW, which operates the power converter in the power save mode, when the ON_TARGET signal is at a logic HIGH and the clock signal is logic LOW. In other examples, the MODE signal may be provided at the Q output, which may depend on the logic implemented by the power converter to which the MODE signal is provided. Examples of the signals at 408, 412 and 416 are shown in the timing diagram of FIG. 8.

Figure 5:
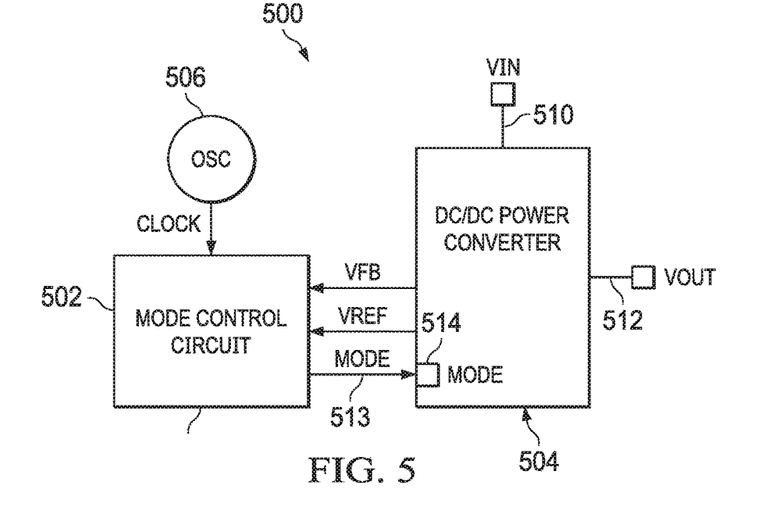
FIG. 5 is a block diagram illustrating an example of another power supply configured to implement out-of-audio switching.

FIG. 5 depicts another example of a system 500, which includes a mode control circuit 502, DC/DC power converter 504 and an oscillator 506. The oscillator 506 generates a CLOCK signal, which is provided to an input of the mode control circuit 502. While the oscillator is illustrated as external to the DC/DC power converter 504 in FIG. 5, in another example, the oscillator 506 may be internal to the DC/DC power converter 504 and provided to the mode control circuit 502 through an electrical connection. For example, the DC/DC power converter 504, oscillator 506 and mode control circuit 502 may be implemented in a single IC chip.

As a further example, the CLOCK signal has a fixed frequency and duty cycle (e.g., about 2 MHz and about 50%), which the power converter 504 uses to generate PWM signals during its PWM mode. The DC/DC power converter 504 includes an input 510 to receive an input voltage VIN and an output 512 to supply a DC output voltage VOUT. The mode control circuit 502 includes a clock input coupled to the oscillator 506 to receive the CLOCK signal as well as inputs coupled to the power converter 504 to receive feedback voltage VFB and reference voltage VREF signal. As described herein, the feedback voltage VFB is representative of (e.g., proportional to) the output voltage and the reference voltage is representative of (e.g., proportional to) the target DC voltage for the DC/DC power converter 504.

The mode control circuit 502 includes an output 513 coupled to a mode select input 514 of the power converter 504 to supply the MODE signal for controlling an operating mode of the power converter 504, which may be a power save mode or a PWM mode. As described herein, a duty cycle of the MODE signal varies based on VREF and VFB signals and the CLOCK signal. By providing the MODE signal at 513 with a duty cycle that varies based on operation of the DC/DC power converter 504, the overall efficiency of the DC/DC power converter may be increased compared to when operating in the PWM mode while also avoiding operation in the audible frequency range.

Figure 6:
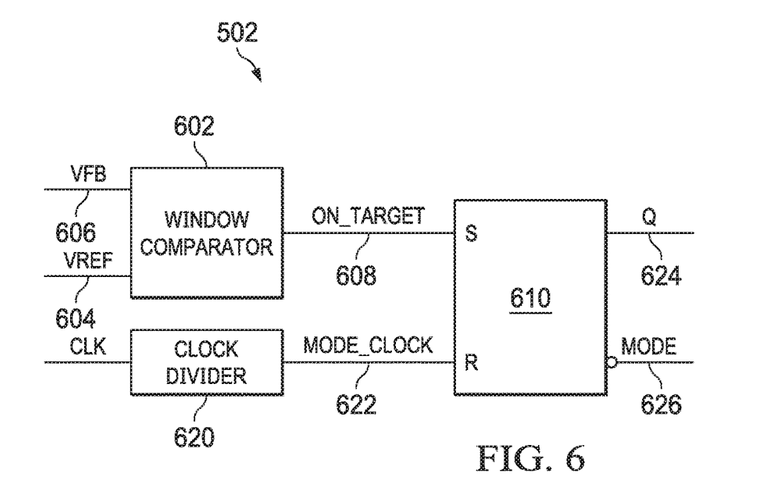
FIG. 6 depicts an example of the mode control circuit of FIG. 5.

FIG. 6 depicts an example of the mode control circuit 502 of FIG. 5, which implements logic to generate the MODE signal to control the mode of the DC/DC power converter 504. In the example of FIG. 6, the mode control circuit 502 includes a window comparator 602, a latch device 610 and a clock divider 620. The window comparator 602 that includes inputs 604 and 606 coupled to the power converter 504 of FIG. 5 to receive input signals VREF and VFB, respectively. The window comparator 602 provides an ON_TARGET signal at an output 608, which is coupled to an input of a latch device 610. The window comparator 602 provides the ON_TARGET signal with a logic value that depends on the value of VFB relative to VREF. As described herein, the window comparator 602 sets the logic value of the ON_TARGET signal to indicate whether the output voltage VOUT resides within an amplitude window of the desired target voltage or outside of the amplitude window of the target voltage. The amplitude window implemented by the window comparator 602 may be fixed or programmable. The amplitude window may define upper and lower thresholds, which may be compared to VFB to determine if the output voltage VOUT is on target. In another example, the amplitude window may define an upper threshold and a main control loop of the power converter 504 can implement the lower threshold for regulating VOUT.

The clock divider 620 includes an input coupled to the oscillator 506 of FIG. 5 to receive the CLOCK signal. The clock divider 620 includes circuitry (e.g., analog or digital circuitry) to generate a MODE_CLOCK signal at an output 622, which signal has a frequency that is a fraction of the input CLOCK signal. For example, the CLOCK signal is a system clock, which has a fixed frequency (e.g., 2 MHz) and fixed duty cycle (e.g., 50%). The clock divider generates the MODE_CLOCK signal with a fixed frequency (e.g., 20 kHz), which is more than one order of magnitude lower, and the same duty cycle. The clock divider 620 is coupled to the R input of the latch device 610 to provide the MODE_CLOCK signal. The latch device also include an S input coupled to an output of the comparator 602 to receive the ON_TARGET signal. The latch device 610 also includes outputs 624 and 626, which are shown as Q and !Q, respectively. In the example of FIG. 6, the latch device 610 supplies the MODE signal at the !Q output 626, which is an inverted version of the Q output and varies based on the ON_TARGET and MODE_CLOCK signals supplied to the respective S and R inputs. In other examples, the MODE signal may be provided at the Q output 414, which may depend on the logic implemented by the power converter to which the MODE signal is provided. Examples of these signals at 608, 622 and 626 are shown in the timing diagram of FIG. 8. Therefore, the MODE signal is logic HIGH, which forces the power converter into the PWM mode, when the MODE_CLOCK signal periodically resets the latch device and for a duration that lasts until the output voltage resides the amplitude window of the target voltage. The mode signal is at a logic LOW, which operates the power converter in the power save mode, when the ON_TARGET signal is at a logic HIGH and the clock signal is logic LOW.

Figure 7:
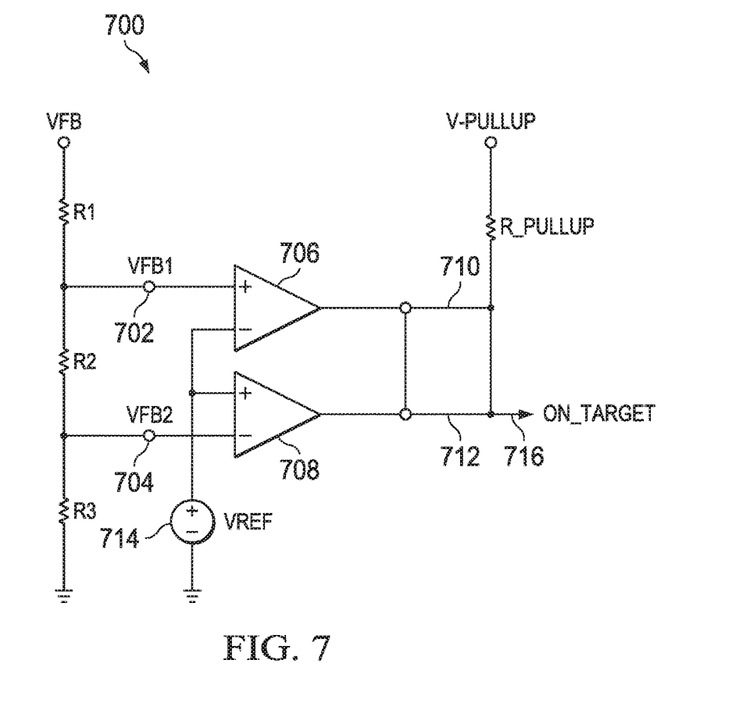
FIG. 7 depicts an example of the window comparator implemented in FIG. 4 or FIG. 6.

FIG. 7 depicts an example of window comparator circuit 700 (which is one example of window comparators 402 and 602). In other examples, different types or configurations of window comparator may be used. In the example of FIG. 7, the window comparator circuit 700 includes inputs 702 and 704 coupled to the converter to receive the feedback voltage VFB. For example, an input voltage divider circuit includes resistors R1, R2 and R3 coupled in series between an input, which is adapted to be coupled to VFB, and electrical ground. The voltage potential across R2 thus provides a first window voltage VFB1 at input 702 of the comparator 706 and the voltage across R3 provides a second window voltage VFB2 at input 704 of the comparator 708. For example, the input 702 is coupled to a non-inverting input of comparator 706 and input 704 is coupled to an inverting input of comparator 708. By configuring the resistors R1, R2 and R3, a corresponding voltage window is established across at the inputs 702 and 704, which is proportional to VFB. A voltage source 714, which provides a reference voltage VREF, is coupled to the other input of each of the comparators 706 and 708. In an example, the amplitude of the reference voltage VREF is programmable and may vary according to the window voltage established by the voltage divider circuit.

The comparator 706 thus compares VREF to the first window voltage VFB1 at 702 to provide a comparator output signal at an output 710. The comparator output signal at 710 has a first logic state (e.g., logic HIGH), which indicates if the first window voltage VFB1 is greater than VREF, and a second logic state (e.g., logic LOW), which indicates if the first window voltage VFB1 is less than the VREF. Similarly, the comparator 708 compares the second window VFB2 with VREF and provides a comparator output at 712 having a first logic state (e.g., logic HIGH), which indicates that VFB is less than VREF, and a second logic state (e.g., logic LOW), which indicates that VFB is greater than VREF.

In the example of FIG. 7, the comparator outputs 710 and 712 are logically combined (e.g., logically ORed) to provide the ON_TARGET logic output signal, which may be provided to an input of a latch device (e.g., latch device 410 or 610), as described herein. In FIG. 7 a pull-up output circuit is provided by connecting a pull-up resistor (R_PULLUP) between the output 716 and a terminal adapted to be coupled to a voltage terminal having a pull-up voltage (V_PULLUP). Thus, if the input signal (VFB) resides the window, the ON_TARGET logic output signal is high. In contrast, if VFB resides outside of the window, the ON_TARGET logic output signal is low. As described herein, when the ON_TARGET signal is logic LOW, the DC/DC power converter (e.g., power converter 104, 304 or 504) is forced into the PWM mode based on the periodic mode clock signal to regulate the VOUT to the desired target voltage. Then, when the ON_TARGET signal changes state to logic HIGH, which indicates that VOUT is "on target", the DC/DC converter is allowed to enter the power save mode for a duration that lasts so long as the periodic MODE CLOCK signal does not assert to reset the MODE signal to logic HIGH, which forces the power converter back into the PWM mode.

Figure 8:
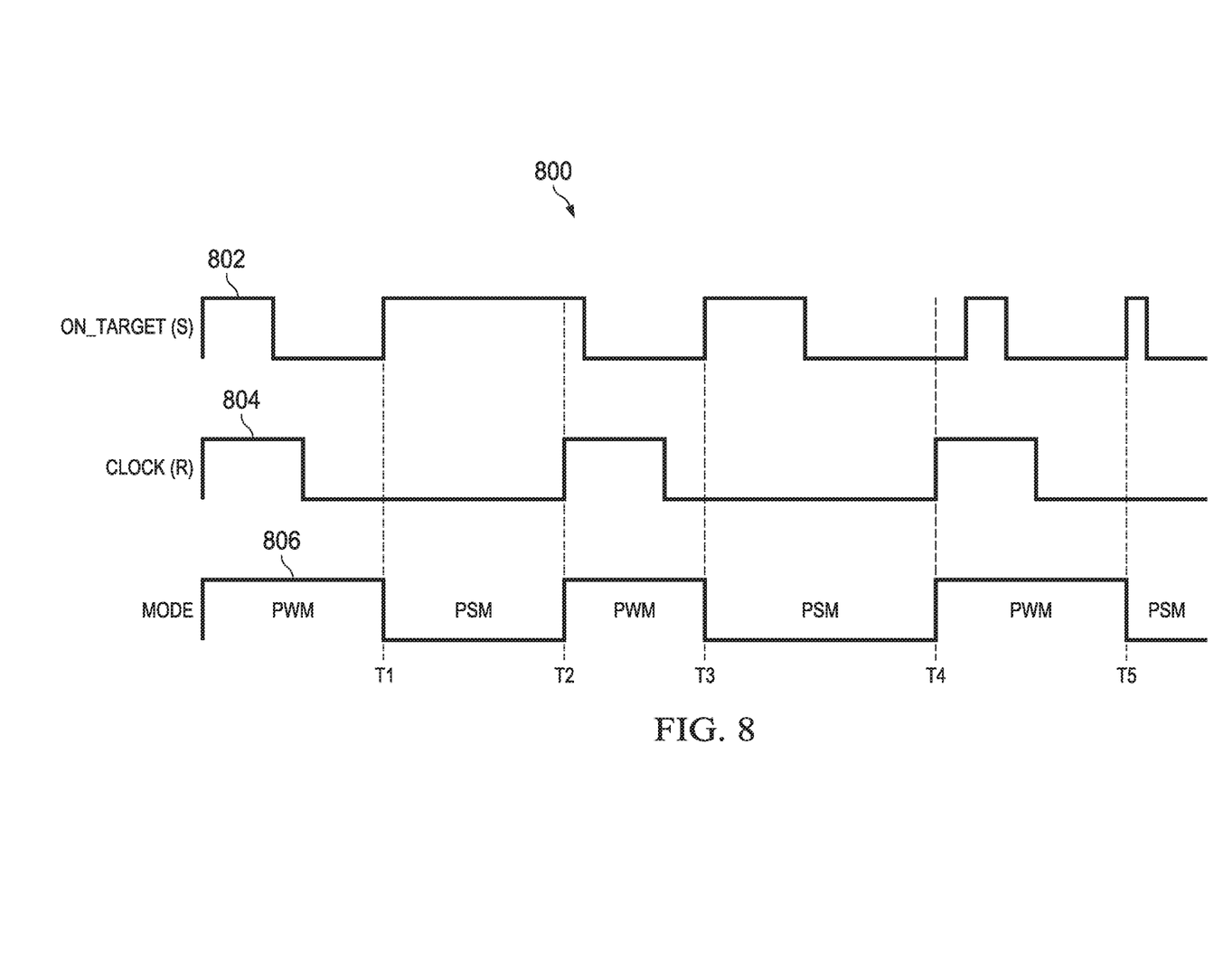
FIG. 8 is a timing diagram for signals depicted in the mode control circuit of FIG. 5.

FIG. 8 is a timing diagram 800 illustrating signals of the mode control circuit (which corresponds to mode control circuit 302 or 502). The timing diagram 800 includes an ON_TARGET signal 802 (which is an example of ON_TARGET signal at 408, 608 or 716), a CLOCK signal 804 (which is an example of the CLOCK signal at 412 or 622) and a MODE signal 806 (which is an example of MODE signal at 416 and 626). The logic levels demonstrated in the example of FIG. 8 are for purposes of example and may vary depending on the logic implemented in the power converter to which the MODE signal is being provided. The mode control circuit implements logic to provide the MODE signal 806 with a variable duty cycle and a fixed frequency based on the ON_TARGET and CLOCK signals 802 and 804. As shown in FIG. 8, when the CLOCK signal is logic HIGH, the MODE signal also is set to logic HIGH, which operates the DC/DC power converter in the PWM mode. The MODE signal 806 further remains at logic HIGH (even after the CLOCK signal changes at logic LOW) until the ON_TARGET signal 802 transitions to a logic HIGH. In response to the ON_TARGET signal 802 transitioning to a logic HIGH, the MODE signal to transitions to logic LOW, as shown at times t1, t3 and t5, which operates the DC/DC power converter in the power save (PS) mode. As mentioned, the MODE signal remains at logic LOW until the CLOCK signal, which has a fixed frequency and duty cycle, transitions from logic LOW to logic HIGH. In response to the CLOCK signal 804 transitioning from logic LOW to HIGH, the MODE signal to transitions to logic HIGH, as shown at times t2 and t4, which operates the DC/DC power converter in the PWM mode.

In this way, the MODE control signal has a fixed frequency (and period) that forces the DC/DC power converter into the PWM mode periodically at a rate sufficient to preclude audible switching noise by the DC/DC power converter. Additionally, the MODE signal also has a variable duty cycle that is modulated based on the ON_TARGET signal, which is representative of whether or not the DC/DC power converter is regulating the output voltage VOUT within an expected range of the target voltage. As a result, the DC/DC power converter is able to operate with increased power efficiency compared to other out-of-audio control schemes. Additionally, by utilizing feedback from the DC/DC power converter to control transitions into the PS mode, the mode control circuit enters the PS mode only if output charge is neutral, which helps ensure stable operation of the DC/DC power converter that avoids DC runaway.

Figure 9:
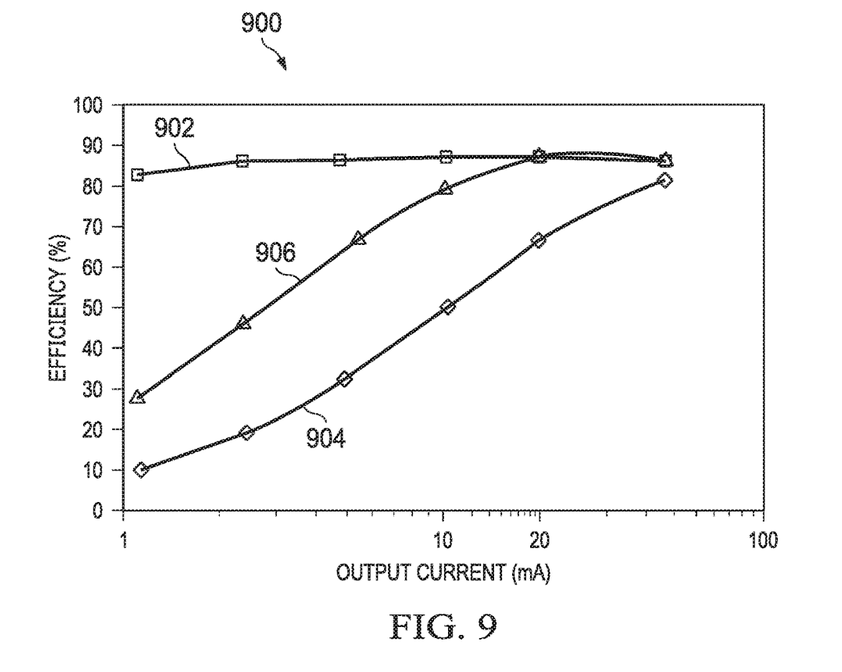
FIG. 9 is a plot depicting efficiency as a function of output current for various operating modes.

FIG. 9 is a graph 900 plotting efficiency as a function of output current for a DC/DC power converter, which may be any of the power converters 104, 304, 504 or 1002, operating in different modes. In particular, the graph 900 includes a plot 902 for operation in a power save mode (e.g., pulse frequency modulation), a plot 904 for operation in a PWM mode and a plot 906 for operation in combined PWM/PS modes as described herein. In the example of FIG. 9, a mode control circuit is coupled to an input of the converter to supply a MODE signal having negative pulses with a fixed frequency (e.g., 20 kHz) and a fixed duty cycle (e.g., 2% (1 µs)). For example, the duty cycle represents a minimum pulse duration for the MODE signal to operate the power converter in the forced PWM mode (e.g., with around 10 switching pulses each period). Shorter pulse duration would result in the power converter staying in the PS mode and longer pulse duration would decrease the efficiency.

By way of example, if the MODE signal is provided with a frequency at about 20 kHz, the efficiencies in the PS and out-of-audio mode are similar above $I_O$=20 mA. As expected, for lower output currents, the efficiency in the out-of-audio mode is somewhere between the efficiencies for the PS and PWM modes. For output current above about 20 mA, pulses on the mode select input pin still initiate short forced PWM bursts, but because the 20 kHz burst frequency is insufficient to maintain the output voltage, the main loop control of the power converter may initiate a new burst if the output voltage drops sufficiently during the off time. Therefore, for output currents above about 20 mA, the power converter operates in a mixed PS/out-of-audio mode, which includes non-constant output voltage ripple frequency but still with similar efficiency as in the PS mode. Additionally, to ensure out-of-audio operation, the pulse generator of the mode control circuit may include an internal re-triggerable timeout timer (e.g., a watch-dog timer) that would initiate a next burst if the power converter operates in an off state for a duration of more than 50 µs (e.g., corresponding to frequency of 20 KHz). The duration of the burst for each forced PWM mode, which duration defines the number of switching cycles, should be long enough for the converter to regulate the output voltage adequately for light loads under all conditions.

Figure 10:
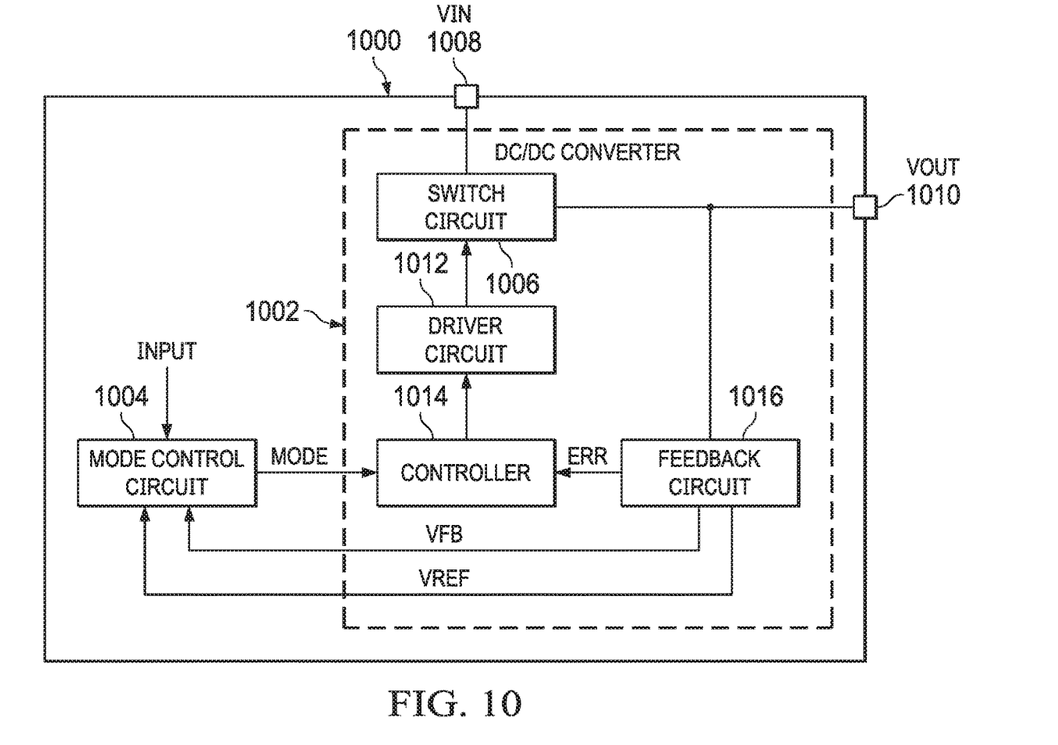
FIG. 10 depicts an example of an integrated circuit that includes a DC/DC power converter and mode control circuit.

FIG. 10 depicts an example of an IC chip 1000 that includes a DC/DC power converter 1002 and a mode control circuit 1004. The mode control circuit 1004 may be implemented by any of the example mode control circuits 102, 200, 302, 502 described herein. FIG. 10 illustrates a block diagram for the DC/DC power converter 1002, which is an example of any of the power converters 104, 304 and 504 described herein and may be a boost converter, a buck converter or a buck-boost converter.

As an example, the power converter 1002 includes a switch circuit 1006 having an input terminal 1008 coupled to a voltage input to receive an input voltage VIN. The switch circuit 1006 also has an output terminal 1010, which is adapted to be coupled to a load, to provide a DC output voltage VOUT. An inductor (not shown) may be coupled between the switch circuit 1006 and the output terminal 1010. The switch circuit 1006 may include one or more switch devices (e.g., field effect transistors or other types of transistors). A driver circuit 1012 is coupled to the switch circuit 1006 for driving the switch circuit to supply output current to the output terminal 1010. The DC/DC converter also includes a controller 1014 coupled to the driver circuit 1012 for controlling the driver circuit based on the MODE signal from the mode control circuit and an error signal (ERR) from a feedback circuit 1016. For example, the controller 1014 has inputs coupled to the mode controller for receiving the MODE signal and to feedback circuitry for receiving the error signal ERR. The controller 1014 includes control logic configured to implement a main control loop, which controls the switch circuit 1006 in the PWM mode based on the MODE and ERR signals, to regulate the output voltage VOUT relative to a target reference voltage (VREF).

The feedback circuit 1016 has an input coupled to a voltage output 1010 and is configured to provide an error signal (ERR) to the controller responsive to the output voltage VOUT. The feedback circuit 1016 also has an output coupled to the mode control circuit 1004 to provide a voltage feedback signal VFB and the reference voltage VREF. For example, the feedback circuit 1016 includes an error amplifier having an input coupled to the output of the converter to receive the feedback voltage, which is representative of the output voltage VOUT. In an example, a voltage divider is coupled between the output terminal 1010 and ground. An intermediate node of the voltage divider provides VFB to the error amplifier and the target reference VREF is coupled to other input of the error amplifier. The error amplifier 1528 is configured to provide the error signal ERR to the controller 1014 responsive to the output voltage VOUT and the target reference voltage VREF. The controller uses the error signal in its main control loop for regulating the output voltage VOUT at 1010.

As described herein, the controller 1014 is also coupled to the mode control circuit 1004 to receive the MODE signal for setting an operating mode of the power converter 1002 in either a forced PWM mode or a power save mode. The mode control circuit 1004 may also receive one or more INPUT signals, such as to supply an input clock and/or configure the duty cycle of the MODE signal as described herein. The MODE signal includes a pulse having a fixed frequency and a configurable duty cycle to operate the power converter 1002 within the inaudible frequency range. In one example, the duty cycle of the MODE signal may be fixed (e.g., by programming an OTP EPROM or an EEPROM), which supplies a periodic pulse based on a clock signal a frequency that is beyond the audible frequency range (e.g., at least 20 kHz) and a duty cycle (e.g., about 2%) to place the power converter 1002 into the forced PWM mode for a number of switching pulses sufficient to prevent DC runaway. In another example, the duty cycle of the MODE signal may vary from cycle to cycle based on the VFB and VREF signals and a mode CLOCK signal, which is a periodic pulse signal provided at a fixed frequency (e.g., at least 20 kHz) and fixed duty cycle (e.g., about 2%).

The mode control circuit described herein does not modify the control loop of the power converter itself. Consequently, the mode control circuit 1004 may be implemented as a standalone circuit, which can be combined with an existing power converter 1002. As shown in the example, of FIG. 10, the mode control circuit 1004 may be implemented in the same IC chip as the power converter 1002. Alternatively, the mode control circuit could be implemented external to the IC chip 1000 that contains the power converter 1002. The external mode control circuit may be implemented in another IC chip or using an arrangement of circuit components (e.g., analog and/or digital components) coupled to the power converter for supplying the mode signal.

Figure 11:
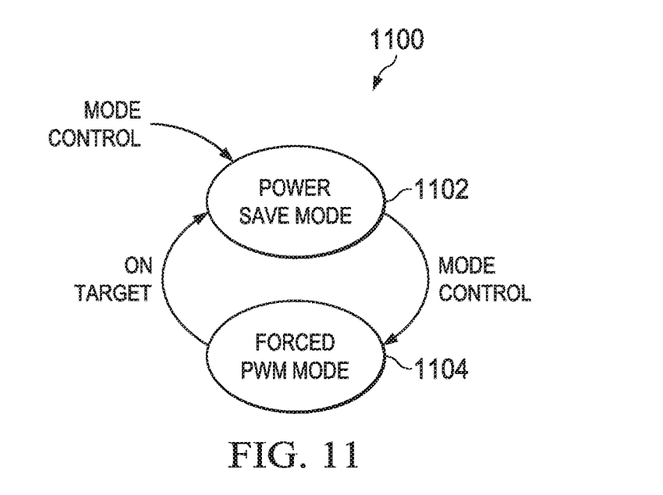
FIG. 11 is a flow diagram illustrating an example method of operating a power converter within an inaudible frequency range.

FIG. 11 is a state diagram 1100 illustrating an example method of operating a DC/DC power converter within an inaudible frequency range. The method may be implemented by a mode control circuit and a DC/DC power converter as described herein with respect to FIGS. 1, 2, 3, 4, 5, 6, 7 and 10.

The method 1100 enters a power save mode at 1102 based on a mode control signal that is generated having a first state. As described herein, the particular logic levels used to provide the mode control signal may be set depending on the logic implemented by the power converter. For example, the mode control signal is provided to a mode control input of a DC-to-DC power converter. The mode control signal has a fixed frequency and a duty signal that is configurable. The mode control signal changes states to transition the power converter from the power save mode to operate a forced PWM mode at 1104 based on the mode clock signal being in a second state, which is different from the first state. The method further operates the power converter within an inaudible frequency range including during transitions between the power save mode and the PWM mode. For example, the power converter transition from the forced PWM mode back to the power save mode at 1102 based on determining that the output voltage resides an expected range (e.g., on target relative to a window of a target voltage). The method may toggle between modes 1102 and 1104 over one or more next cycles of the mode control signal and continue operating the power converter within the inaudible frequency range.

Although not shown in FIG. 11, the method 1100 may compare a feedback voltage, which is representative of an output voltage of the power converter, relative to a reference voltage, which is representative of a target voltage for the power converter. The method may provide a target signal based on the comparison. The method further may generate the mode control signal in the first state to operate the power converter in the power save mode based on a mode clock signal being in a first state (e.g., a de-asserted state) and a target signal having a state to indicate that the output voltage of the power converter resides the amplitude window of a target voltage for the power converter. The method 1100 may also generate the mode control signal in the second state to operate the power converter in the PWM mode based on the mode clock signal being in a second state (e.g., an asserted state) or the target signal having a state to indicate that the output voltage of the power converter resides outside the amplitude window of the target voltage for the power converter. The method 1100 may further configure circuitry of a mode control circuit to control the duty cycle to enable transitioning between the PWM and power save modes within an inaudible frequency range of the power converter.

In this description, the term "based on" means based at least in part on.

Modifications are possible in the described embodiments, and other embodiments are possible, within the scope of the claims.

What is claimed is:

1. A circuit comprising:
   a mode control circuit having an input and a mode control output, the mode control output adapted to be coupled to a mode input of a DC-to-DC power converter, the mode control circuit configured to provide a mode control signal at the mode control output, the mode control signal having a frequency and a duty cycle for causing the power converter to operate within an inaudible frequency range by transitioning the power converter between a power save mode and a pulse width modulation (PWM) mode, in which the mode control circuit is configured to control the duty cycle responsive to the input of the mode control circuit.

2. The circuit of claim 1, wherein the mode control circuit comprises:
   a window comparator having a feedback input, a reference input and a comparator output, the feedback input adapted to be coupled to the power converter to receive a feedback voltage representative of an output voltage of the power converter, and the reference input adapted to be coupled to the power converter to receive a reference voltage representative of a target voltage for the power converter, the window comparator configured to provide a target signal at the comparator output indicative of whether the output voltage of the power converter resides an amplitude window of the target voltage for the power converter.

3. The circuit of claim 2, wherein the feedback input of the window comparator is coupled to the power converter to receive the feedback voltage and the reference input of the window comparator is coupled the power converter to receive the reference voltage.

4. The circuit of claim 2, wherein the mode control circuit comprises:

a latch having a target input, a clock input and a latch output, the target input coupled to the comparator output to receive the target signal and the clock input to receive a mode clock signal having a periodic pulse at the frequency, the latch configured to provide the mode control signal at the latch output based on the target signal and the mode clock signal.

5. The circuit of claim 4, further comprising a clock divider having an input adapted to be coupled to an output of an oscillator to receive an input clock signal, the clock divider having an output coupled to the clock input of the latch to provide the mode clock signal, the mode clock signal having a frequency that is less than the input clock signal.

6. The circuit of claim 5, further comprising the oscillator in which the output of the oscillator is coupled to a clock input of the power converter and to the input of the clock divider.

7. The circuit of claim 4, wherein
the latch is configured to provide the mode control signal in a power save state, which operates the power converter in the power save mode, responsive to the mode clock signal being in a first state and the target signal having a state that indicates the output voltage of the power converter resides the amplitude window of the target voltage for the power converter,
the latch is configured to provide the mode control signal in another state, which operates the power converter in the PWM mode, responsive to the mode clock signal being in a second state or the target signal having a state that indicates the output voltage of the power converter resides outside the amplitude window of the target voltage for the power converter.

8. The circuit of claim 1, further comprising the power converter, wherein the power converter comprises:
a switch circuit having an output coupled to an output of the power converter;
a feedback circuit having a feedback output configured to provide an error signal at the feedback output responsive to an output voltage at an output of the power converter relative to a reference voltage; and
a controller having a mode input, a feedback input and a controller output, the mode input of the controller coupled to the mode control output, the feedback input coupled to the output of the feedback circuit, and the controller output coupled to the switch circuit to control the switch circuit within the inaudible frequency range responsive to the mode control signal and the error signal.

9. The circuit of claim 8, comprising an integrated circuit chip that includes the power converter, wherein the mode control circuit is one of external to the integrated circuit chip or internal to the integrated circuit chip.

10. The circuit of claim 1, wherein the mode control circuit comprises:
a programmable device configured to provide a duty cycle value to c the duty cycle of the mode control signal responsive to program input; and
a pulse generator configured to provide the mode control signal at the output of the mode control circuit based on the duty cycle value.

11. A power supply system, comprising:
a DC-to-DC power converter having a mode input and a voltage output, the power converter configured to provide a regulated DC output voltage at the voltage output; and a mode control circuit having an input and a mode control output, the mode control output coupled to the mode input of the power converter to provide a mode control signal, the mode control signal having a frequency and a duty cycle, the mode control circuit configured to control the duty cycle responsive to the input of the mode control circuit, in which the power converter is configured to operate within an inaudible frequency range by switching between a pulse width modulation (PWM) mode and a power save mode responsive to the mode control signal.

12. The system of claim 11, wherein the mode control circuit comprises:
a window comparator having a feedback input, a reference input and a comparator output, the feedback input adapted to be coupled feedback circuitry to receive a feedback voltage representative of an output voltage of the power converter, and the reference input is to receive a reference voltage representative of a target voltage for the power converter, the window comparator configured to provide a target signal at the comparator output indicative of whether the output voltage of the power converter resides an amplitude window of the target voltage for the power converter.

13. The system of claim 12, wherein the feedback input of the window comparator is coupled to the power converter to receive the feedback voltage and the reference input of the window comparator is coupled to the power converter to receive the reference voltage.

14. The system of claim 12, wherein the mode control circuit comprises:
a latch having a target input, a clock input and a latch output, the target input coupled to the output of the window comparator to receive the target signal and the clock input to receive a mode clock signal that provides a periodic pulse at the frequency, the latch configured to provide the mode control signal at the latch output responsive to the target signal and the mode clock signal.

15. The system of claim 14, wherein the mode control circuit comprises a clock divider having an input adapted to be coupled to an output of an oscillator to receive an input clock signal, the clock divider having an output coupled to the clock input of the latch to provide the mode clock signal, the mode clock signal having a frequency that is less than the input clock signal.

16. The system of claim 15, the output of the oscillator coupled to a clock input of the power converter and to the input of the clock divider.

17. The system of claim 14, wherein
the latch is configured to provide the mode control signal in a power save state, which operates the power converter in the power save mode, responsive to the mode clock signal being in a first state and the target signal having a state that indicates the output voltage of the power converter resides the amplitude window of the target voltage for the power converter, and
the latch is configured to provide the mode control signal in another state, which operates the power converter in the PWM mode, responsive to the mode clock signal being in a second state or the target signal having a state that indicates the output voltage of the power converter resides outside the amplitude window of the target voltage for the power converter.

18. The system of claim 11, wherein the power converter comprises:

a switch circuit having an output coupled to the output of the power converter;

a feedback circuit having a feedback output configured to provide an error signal at the feedback output responsive to the output voltage of the power converter relative to a reference voltage; and a controller having a mode input, a feedback input and a controller output, the mode input of the controller coupled to the mode control output, the feedback input coupled to the output of the feedback circuit, and the controller output coupled to the switch circuit to control the switch circuit within the inaudible frequency range responsive to the mode control signal and the error signal.

19. The system of claim 18, further comprising an integrated circuit chip that includes the power converter.

20. A method, comprising:

generating a mode control signal that is provided to a mode control input of a DC-to-DC power converter, the mode control signal having a fixed frequency and a duty cycle;

controlling the power converter to operate in a power save mode based on the mode control signal being in a first state; and controlling the power converter to operate in a pulse width modulation (PWM) mode based on the mode control signal being in a second state, which is different from the first state, wherein the power converter operates within an inaudible frequency range including during transitions between the power save mode and the PWM mode.

21. The method of claim 20, further comprising:

comparing a feedback voltage, which is representative of an output voltage of the power converter, relative to a reference voltage, which is representative of a target voltage for the power converter;

providing a target signal based on the comparison;

generating the mode control signal in the first state to operate the power converter in the power save mode responsive to a mode clock signal being in a first state and the target signal having a state that indicates the output voltage of the power converter resides an amplitude window of the target voltage for the power converter, and generating the mode control signal in the second state to operate the power converter in the PWM mode responsive to the mode clock signal being in a second state, which is different from the first state of the mode clock signal, or the target signal having a state that indicates that the output voltage of the power converter resides outside the amplitude window of the target voltage for the power converter.

22. The method of claim 20, further comprising configuring circuitry of mode control circuit to control the duty cycle to enable transitioning between the PWM and power save modes to maintain operation of the power converter within the inaudible frequency range.

* * * * *